United States Patent
Whitehead, Jr. et al.

(10) Patent No.: US 7,508,481 B2
(45) Date of Patent: Mar. 24, 2009

(54) LIQUID CRYSTAL PANEL HAVING MULTIPLE SPACER WALLS AND METHOD OF MAKING THE SAME

(75) Inventors: Anthony Joseph Whitehead, Jr., Hsin-Chu (TW); Ta-Shuang Kuan, Hsin-Chu Hsien (TW); Chi-Tai Meng, Tao-Yuan Hsien (TW)

(73) Assignee: United Microdisplay Optronics Corp., Hsin-Chu (TW)

( * ) Notice: Subject to any disclaimer, the term of this patent is extended or adjusted under 35 U.S.C. 154(b) by 419 days.

(21) Appl. No.: 11/306,587

(22) Filed: Jan. 3, 2006

(65) Prior Publication Data

US 2007/0153211 A1   Jul. 5, 2007

(51) Int. Cl.
   *G02F 1/1339* (2006.01)
(52) U.S. Cl. .................. 349/153; 349/155; 349/190
(58) Field of Classification Search .................. 349/153, 349/155, 156, 158, 190
   See application file for complete search history.

(56) References Cited

U.S. PATENT DOCUMENTS

| | | | | |
|---|---|---|---|---|
| 5,982,472 A | * | 11/1999 | Moore | 349/156 |
| 6,355,955 B1 | * | 3/2002 | Gardner et al. | 257/330 |
| 6,392,733 B1 | * | 5/2002 | Gregory | 349/146 |
| 6,646,709 B2 | * | 11/2003 | Matsumoto | 349/156 |
| 6,870,591 B2 | * | 3/2005 | Lee et al. | 349/153 |
| 7,038,751 B2 | * | 5/2006 | Lee | 349/139 |
| 2005/0073637 A1 | * | 4/2005 | Liao | 349/153 |

FOREIGN PATENT DOCUMENTS

| | | |
|---|---|---|
| CN | 1178094 C | 12/2004 |
| CN | 1632649 A | 6/2005 |
| CN | 1635427 A | 7/2005 |

* cited by examiner

*Primary Examiner*—Mike Qi
(74) *Attorney, Agent, or Firm*—Winston Hsu (57) ABSTRACT

A liquid crystal panel includes a first substrate having thereon a display active region; an inner spacer wall disposed on the first substrate along periphery of the display active region; an outer spacer wall disposed adjacent to the inner spacer wall on the first substrate; a groove formed between the inner spacer wall and the outer spacer wall; a seal spread in the groove; a second substrate being supported by the inner spacer wall and the outer spacer wall and being glued to the first substrate via the seal, wherein the first substrate, the second substrate and the inner spacer wall define a chamber; and a liquid crystal layer filling the chamber by using one-drop-fill process.

8 Claims, 9 Drawing Sheets

LIQUID CRYSTAL PANEL HAVING MULTIPLE SPACER WALLS AND METHOD OF MAKING THE SAME

BACKGROUND OF THE INVENTION

1. Field of the Invention

The present invention relates to a liquid crystal panel, and more particularly, to a liquid crystal-on-silicon (LCoS) panel utilizing one or multiple spacer walls and one-drop-fill technology.

2. Description of the Prior Art

Liquid crystal-on-silicon (LCoS) micro-display panel is arguably the heart of the reflective LCoS projectors and rear-projection televisions. The LCoS micro-display devices are tiny, less expensive, and have high resolution. As known in the art, the difference between a LCoS micro-display and a conventional thin film transistor-liquid crystal display (TFT-LCD) is materials used for forming substrates. Both of a cover and a backplane are made of glass in a TFT-LCD, nevertheless, the cover in a LCoS display is made of glass, but the backplane in a LCoS display is a semiconductor silicon substrate. Therefore, a LCoS process combines LCD techniques and complementary metal-oxide semiconductor (CMOS) processes.

Figure 1:
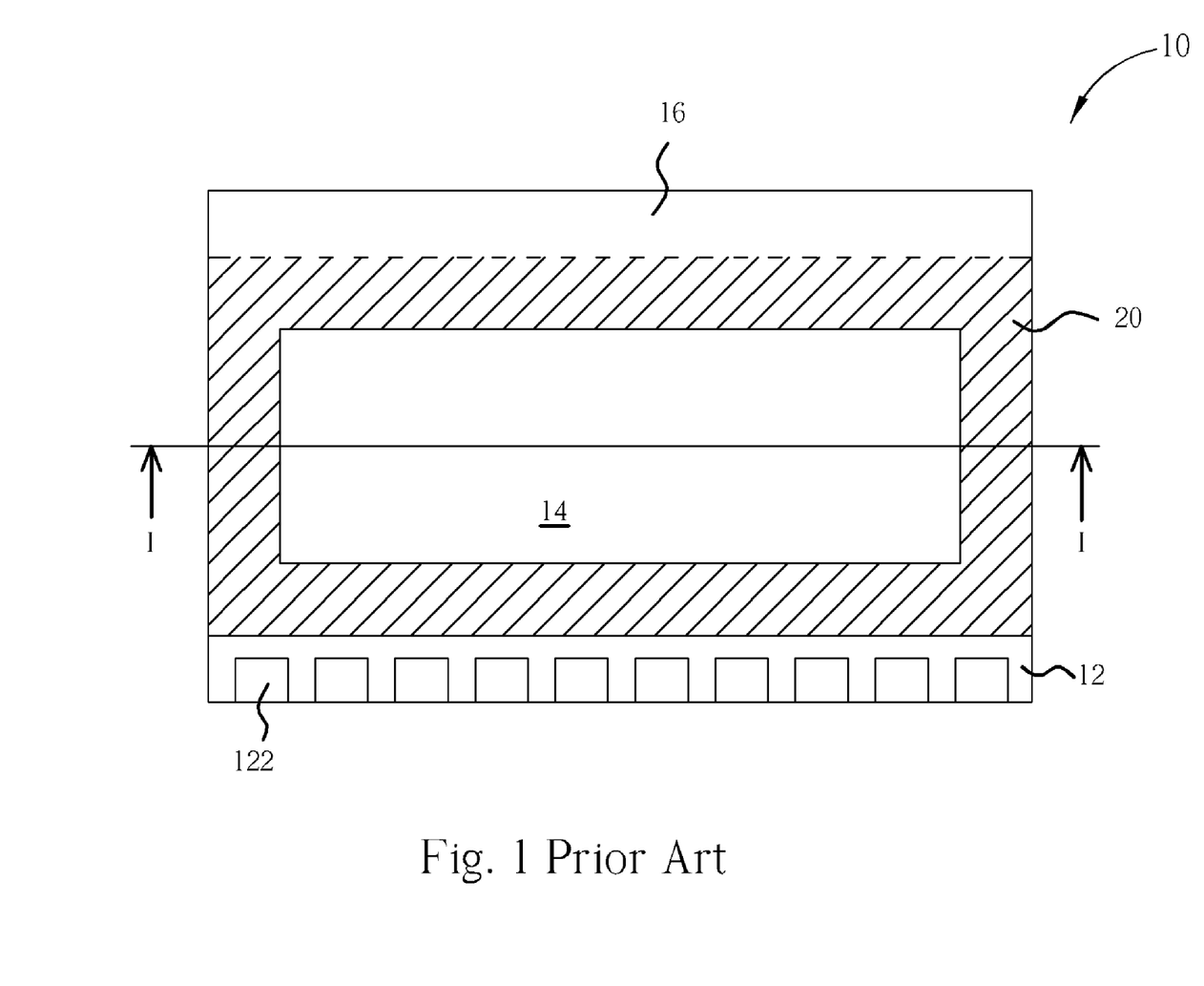
FIG. 1 is a schematic top view of a liquid crystal-on-silicon (LCoS) panel according to the prior art.
Figure 2:
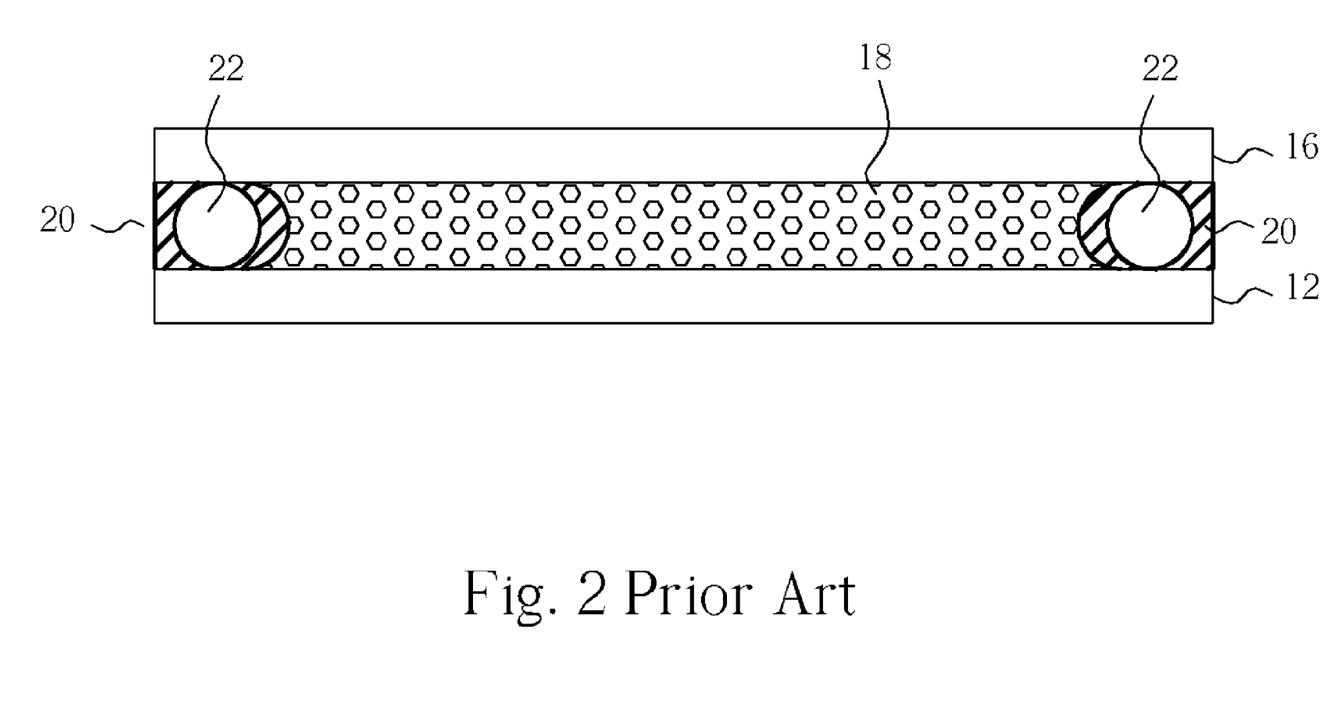
FIG. 2 is a schematic cross-sectional view of the LCoS panel taken along line I-I of FIG. 1.

Please refer to FIG. 1 and FIG. 2, wherein FIG. 1 is a schematic top view of a LCoS panel 10 according to the prior art and FIG. 2 is a schematic cross-sectional view of the LCoS panel 10 taken along line I-I of FIG. 1. The prior art LCoS panel 10 comprises a silicon substrate 12 used as a backplane and a glass substrate 16 being composed of, for example, indium tin oxide (ITO) glass. The silicon substrate 12 further comprises a plurality of pixel arrays (not explicitly shown) formed on its display active region 14. A liquid crystal layer 18 is sealed between the silicon substrate 12 and the glass substrate 16. Spherical spacers 22 of approximately equal size are disposed between the silicon substrate 12 and the glass substrate 16. In addition, a plurality of bonding pads 122 are formed on the longer side of the silicon substrate 12 used for soldering up the backplane and the cover in subsequent processes.

In LCD devices, the thickness of the liquid crystal layer 18, or the cell gap (i.e., the space between a transparent conducting substrate and a semiconductor substrate) has to be precisely controlled to a specific value so as to ensure the display performance. In order to maintain the cell gap, plastic beads, glass beads or glass fibers are normally interposed between two liquid crystal display substrates and used as spacers. Thus, this cell gap is defined by the spacer height. In a conventional LCD process, the spacers are positioned by spraying, so the positions between the two liquid crystal display substrates cannot be controlled accurately. Consequently, the display performance of the liquid crystal display device is affected due to light scattering by the spacers that are present in the light transmitting regions. Furthermore, the spacers tend to be mal-distributed so that the display performance in portions of the LCD with spacers bunched is impaired, and the uniformity of the cell gap cannot be precisely maintained.

According to the prior art, seal glue 20 is applied to the periphery of the display active area 14 of the silicon substrate 10. The seal glue 20 has a slit or break in it for liquid crystal injection in the subsequent processes. The prior art LCoS panel 10 has a drawback in that the design width of the seal glue 20 is about 2000 micrometers and the design width is about 500 micrometers, which occupy a large chip surface area. Further, in the traditional LC injection method, the cell will be vacuum filled by capillary attraction after the glass substrate 16 and the silicon substrate 12 are assembled. Such injection method has the drawbacks of wasting time and liquid crystal material.

SUMMARY OF THE INVENTION

Accordingly, it is the primary object of the present invention to provide an improved LCoS panel and method of making in order to solve the above-mentioned problems.

According to the claimed invention, a liquid crystal panel includes a first substrate having thereon a display active region; an inner spacer wall disposed on the first substrate along periphery of the display active region; an outer spacer wall disposed adjacent to the inner spacer wall on the first substrate, wherein the inner spacer wall and the outer spacer wall are of approximately equal height; a groove formed between the inner spacer wall and the outer spacer wall; a seal spread in the groove; a second substrate being supported by the inner spacer wall and the outer spacer wall and being glued to the first substrate via the seal, wherein the first substrate, the second substrate and the inner spacer wall define a chamber; and a liquid crystal layer filling the chamber by using one-drop-fill process.

According to another preferred embodiment, a method of fabricating a liquid crystal panel is disclosed. The method comprises the following steps:

(a) providing a first substrate comprising thereon a display active region;

(b) depositing a dielectric layer over the first substrate by using various deposition methods;

(c) etching a portion of the dielectric layer to expose the display active area and to form an inner spacer wall and an outer spacer wall enclosing the display active region, and a groove between the inner spacer wall and the outer spacer wall, wherein the inner spacer wall and the outer spacer wall are of approximately equal height;

(d) spreading seal in the groove;

(e) performing an one-drop-fill process to dispose drops of liquid crystal on the display active region within the inner spacer wall;

(f) placing a second substrate on the first substrate, wherein the second substrate is supported by the inner and outer spacer walls and is glued to the first substrate via the seal; and (g) curing the seal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 3:
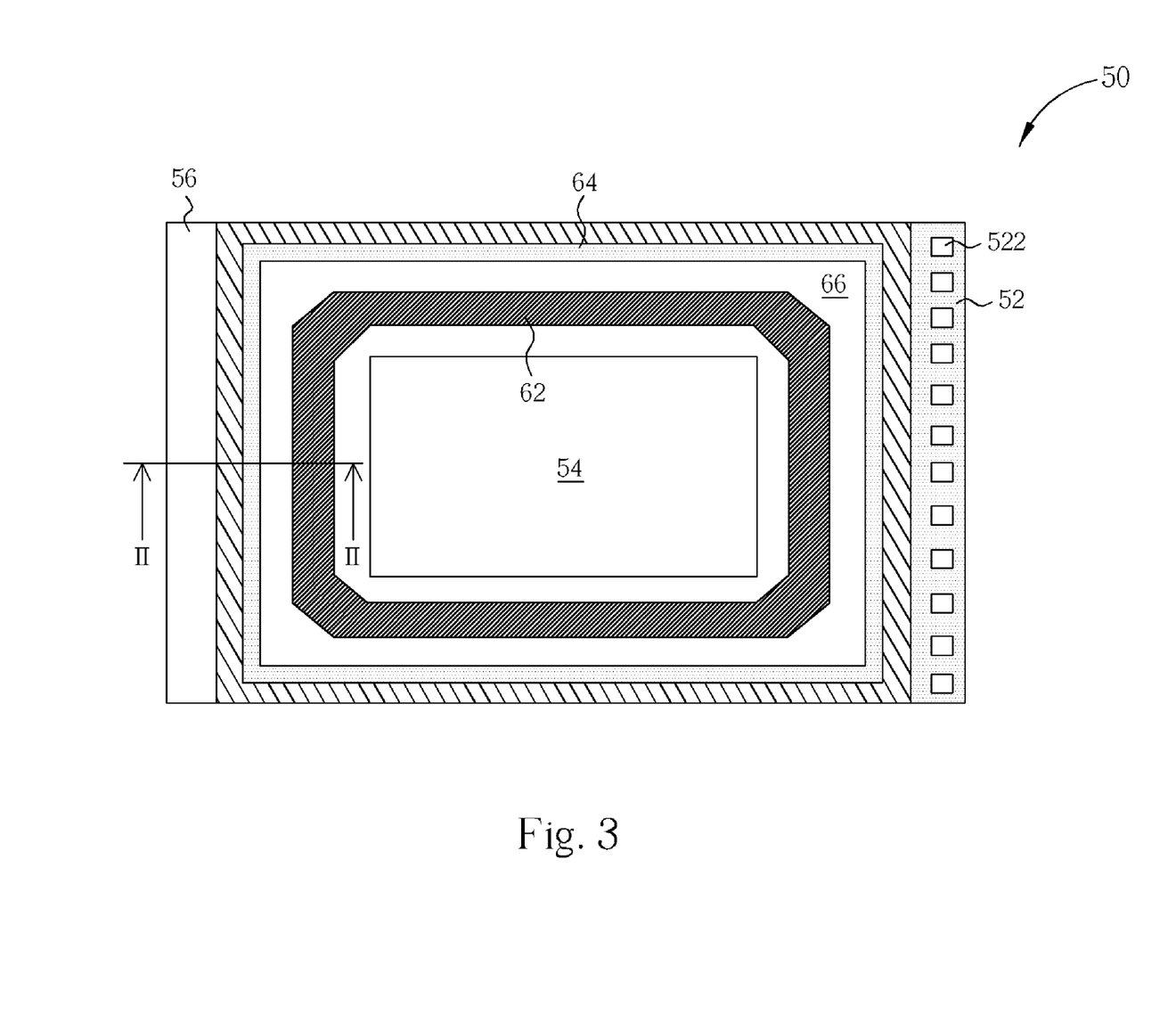
FIG. 3 is a schematic top view of a LCoS panel according to one preferred embodiment of the present invention.
Figure 4:
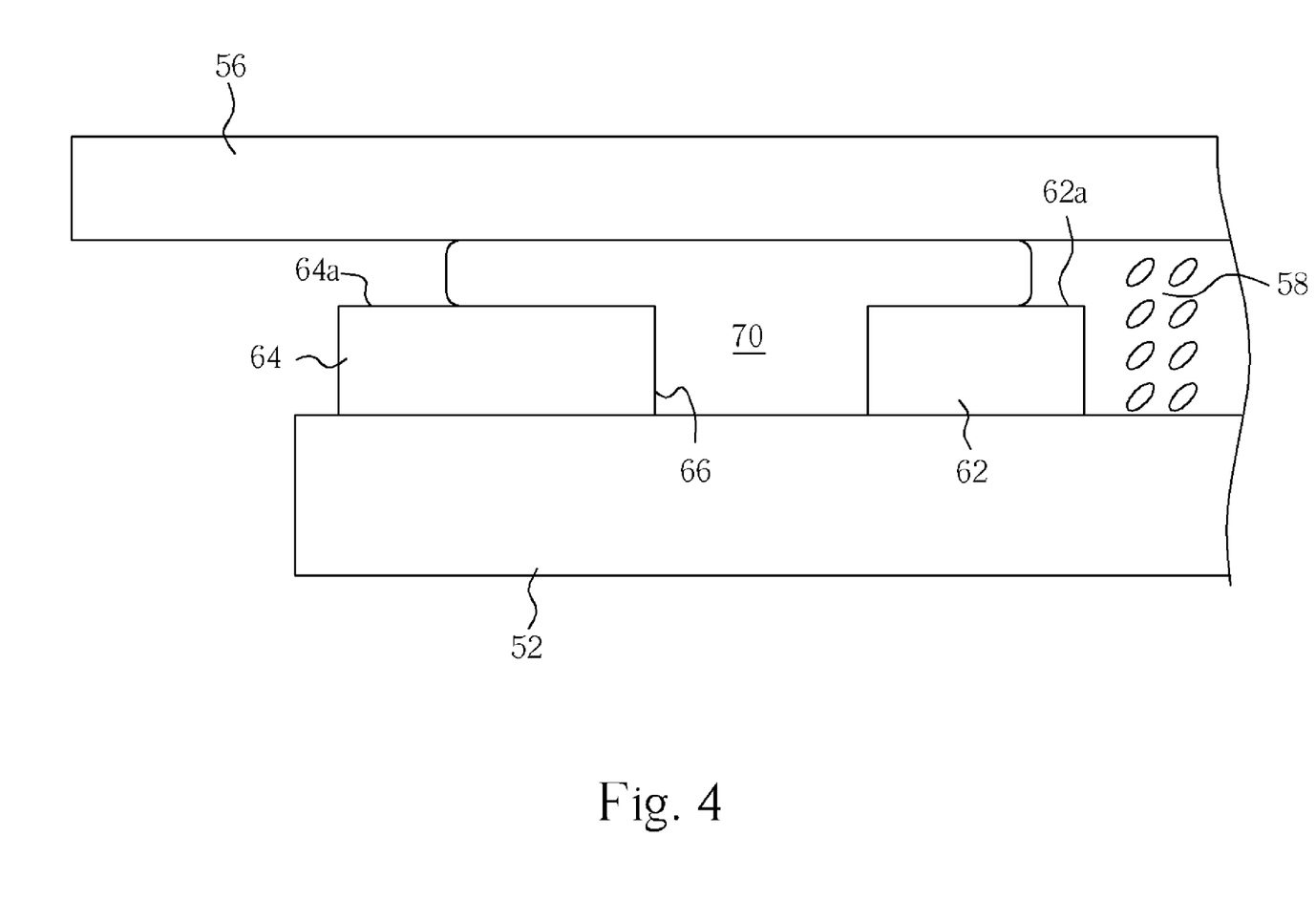
FIG. 4 is a schematic cross-sectional view of the LCoS panel taken along line II-II of FIG. 3.

Please refer to FIG. 3 and FIG. 4, wherein FIG. 3 is a schematic top view of a LCoS panel 50 according to one preferred embodiment of the present invention and FIG. 4 is a schematic cross-sectional view of the LCoS panel 50 taken along line II-II of FIG. 3. The LCoS panel 50 comprises a silicon substrate 52 used as a backplane, and a glass substrate 56 being composed of, for example, indium tin oxide (ITO) glass. The silicon substrate 52 further comprises a plurality of pixel arrays (not explicitly shown) formed on its display active region 54. A liquid crystal layer 58 is sealed between the silicon substrate 52 and the glass substrate 56.

It is one salient feature of the invention that the display active region 54 of the silicon substrate 52 is surrounded by dual spacer walls including an inner spacer wall 62 and an outer spacer wall 64. According to the preferred embodiment of this invention, the inner spacer wall 62 and the outer spacer wall 64 are two parallel walls of approximately equal height. A groove 66 is provided in between the inner spacer wall 62 and the outer spacer wall 64 for accommodating seal 70. The groove 66 also increases the effective contact area between the seal 70 and the silicon substrate 52 such that the adhesion is improved. The inner spacer wall 62 and the outer spacer wall 64 have a flat top surface 62a and a flat top surface 64a, respectively. In addition, the plural bonding pads 522 are disposed on the shorter side of the silicon substrate 52.

According to this invention, the inner spacer wall 62 and the outer spacer wall 64 are fabricated at the last stage of the fabrication processes for making the silicon substrate 52. The inner spacer wall 62 and the outer spacer wall 64 are fabricated and defined along the periphery of the display active region 54 by using standard semiconductor processes such as chemical vapor deposition (CVD) methods, chemical mechanical polish (CMP), lithography and etching. According to the preferred embodiment, the inner spacer wall 62 and the outer spacer wall 64 are made of dielectric materials such as silicon dioxide, but not limited thereto.

In typical LCD devices, as mentioned above, spherical spacers such as plastic beads or glass beads are dispersed randomly on the entire silicon substrate, even in the display active region or viewing areas, or mixed with the glue seal. However, spacers in the viewing area of a display frequently lead to the reduced contrast of the display. In the present invention, the plastic beads or glass beads are not used and are replaced with the dual spacer walls, i.e., the inner spacer wall 62 and the outer spacer wall 64. By doing this, the cell gap is effectively controlled so as to assure the proper operation of the LCD devices. Since the conventional spherical spacers such as plastic beads or glass beads are omitted, the cost of the panel product can be reduced.

As shown in FIG. 4, it is another salient feature of the invention that by using the dual spacer walls, the design width of the seal 70 shrinks from 2000 micrometers to about 500 micrometers. By shrinking the design width of the seal 70, the surface area of each panel can be reduced and the number of the panels of each wafer is increased.

Figure 5:
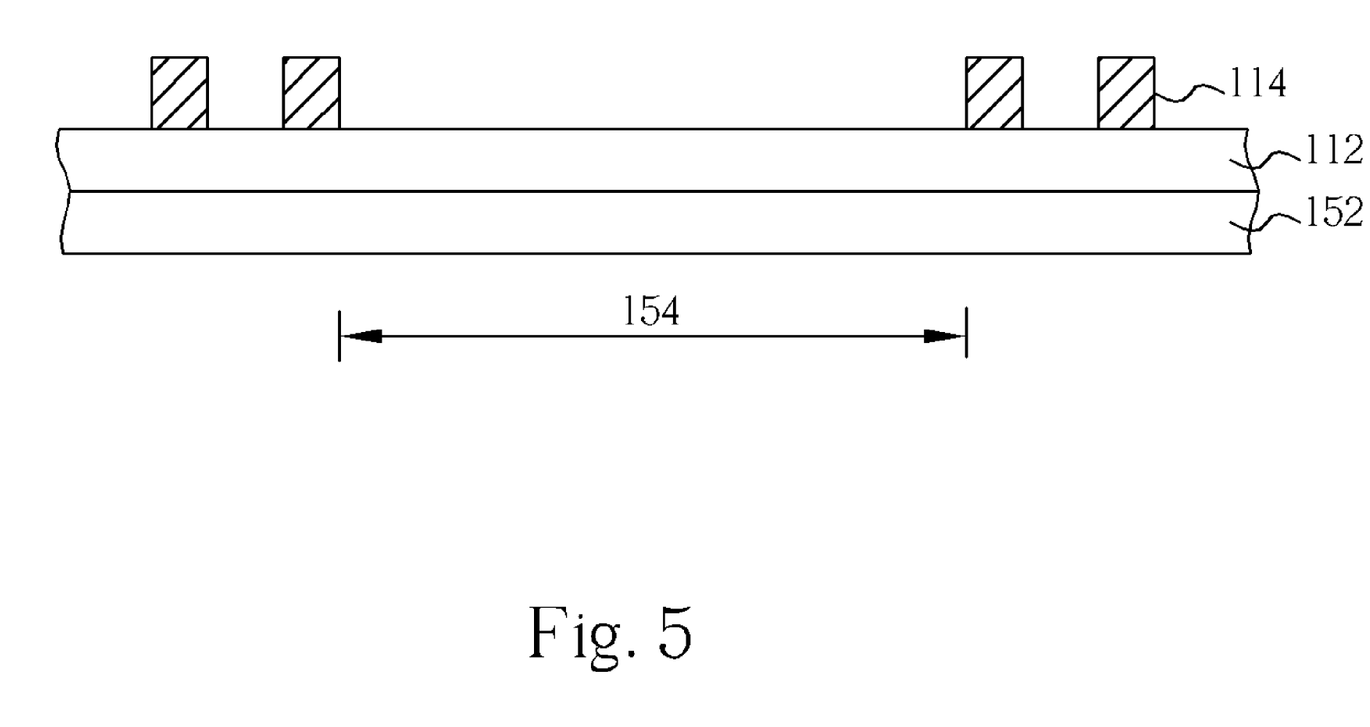
FIG. 5 to FIG. 9 are schematic, cross-sectional diagrams showing the method of fabricating a LCoS panel with dual spacer walls in accordance with one preferred embodiment of this invention.

Please refer to FIG. 5 to FIG. 9. FIG. 5 to FIG. 9 are schematic, cross-sectional diagrams showing the method of fabricating a LCoS panel with dual spacer walls in accordance with one preferred embodiment of this invention. As shown in FIG. 5, a wafer or silicon substrate 152 having thereon a display active region 154 is provided. The display active region 154 has therein an integrated control circuit, electrodes connected to the integrated control circuit, and metal mirror plates for reflecting light (not explicitly shown). It is understood that the integrated control circuit may comprises an array of transistors such as MOS transistors. A chemical vapor deposition process is carried out to deposit a silicon dioxide layer 112 over the silicon substrate 152. The thickness of the silicon dioxide layer 112 is approximately equal to the cell gap of the LCoS panel. Thereafter, a photoresist pattern 114, which defines the position and pattern of the dual spacer walls to be etched into the underlying silicon dioxide layer 112, is formed over the silicon dioxide layer 112. According to another embodiment, prior to the deposition of the silicon dioxide layer 112, a protective film or an alignment film may be deposited over the silicon substrate 152.

Figure 6:
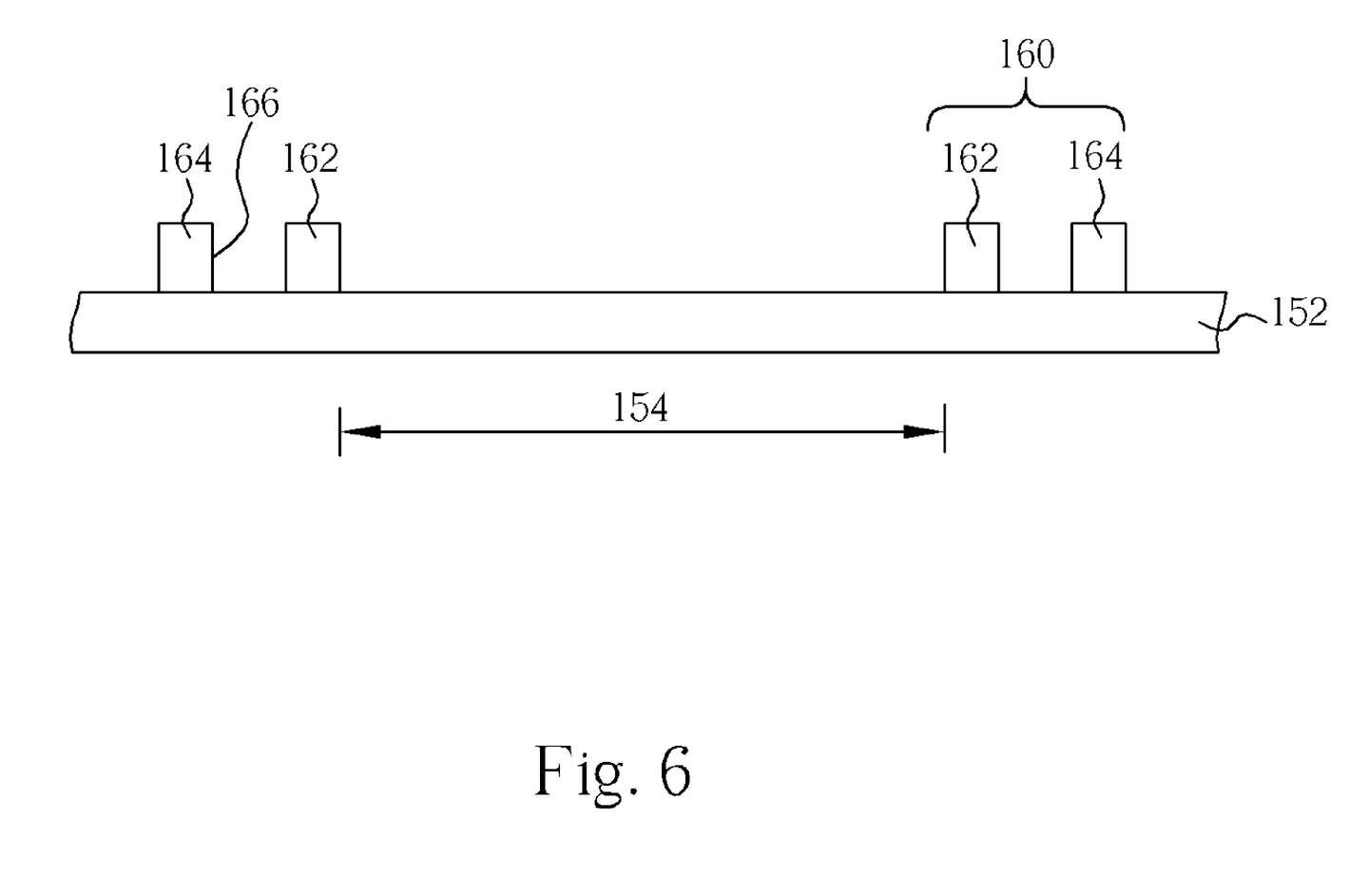

As shown in FIG. 6, using the photoresist pattern 114 as an etching hard mask, an anisotropic dry etching process is carried out to remove the silicon dioxide layer 112 that is not covered by the photoresist pattern 114 until the silicon substrate 152 is exposed, whereby forming the dual spacer walls 160 enclosing the display active region 154. The dual spacer walls 160 includes an inner spacer wall 162 and an outer spacer wall 164. The photoresist pattern 114 is then stripped. According to this invention, the inner spacer wall 162 and the outer spacer wall 164 are both continuous walls and have no break or slit. The inner spacer wall 162 minimizes the contact between the seal and the liquid crystal, thereby preventing potential pollution of the liquid crystal.

Since the inner spacer wall 162 and the outer spacer wall 164 are fabricated by standard semiconductor processes, the deviation of the height of the spacer walls is very small. The cell gap between the silicon substrate 152 and glass substrate is effectively controlled so as to assure the proper operation of the LCD devices. A groove 166 is formed between the inner spacer wall 162 and the outer spacer wall 164. As previously described, the groove 166 is used to accommodate seal and to increase the contact between the silicon substrate 152 and the seal.

Figure 7:
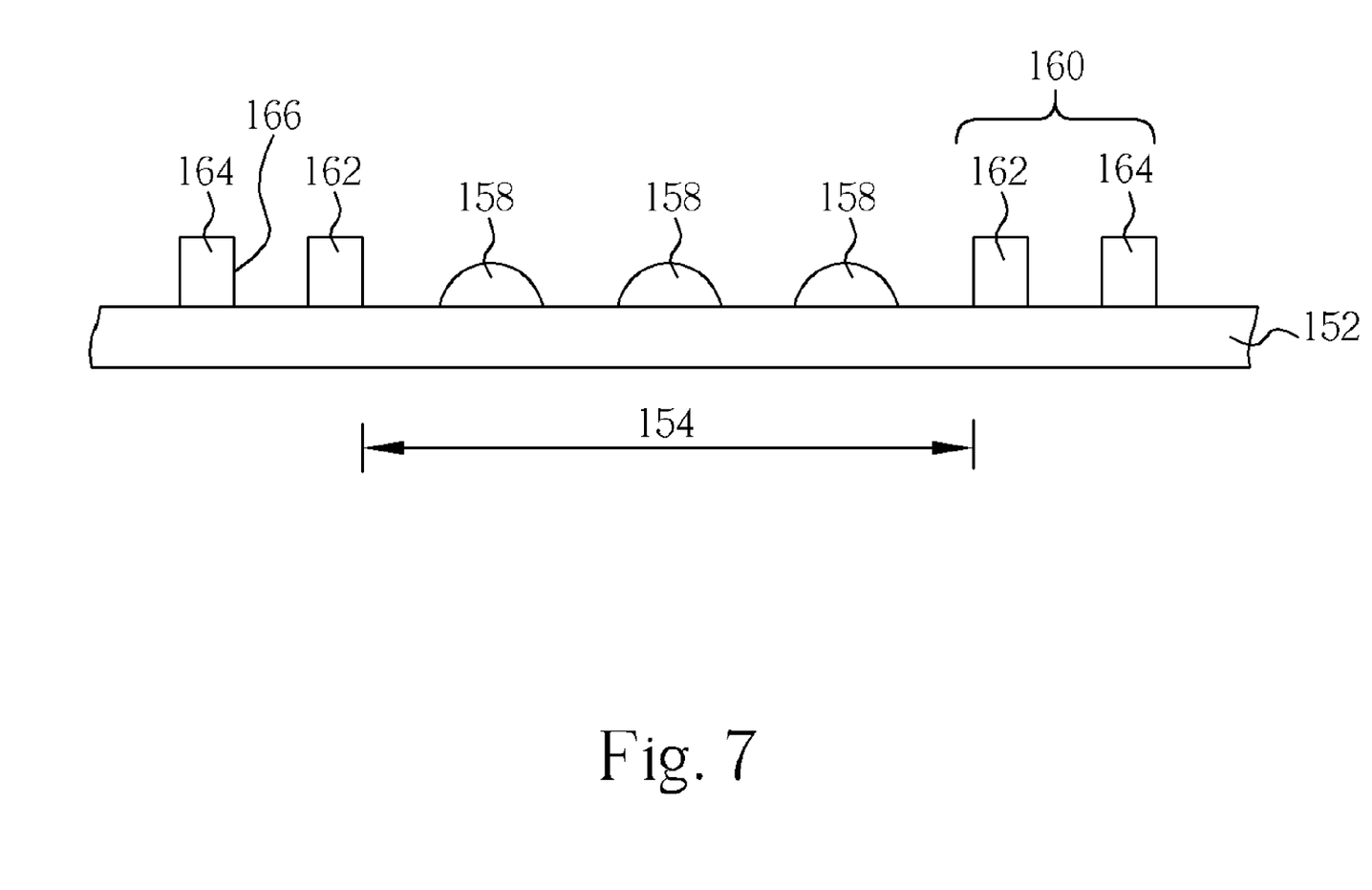

As shown in FIG. 7, after the formation of the dual spacer walls 160, one-drop-fill (ODF) process is carried out to form liquid crystal drops on the silicon substrate 152. The ODF process is to drop the liquid crystal 158 directly on display active region 154 within the inner spacer wall 162. The ODF Process is a technology currently developed in the LCD field. With the utilization of this state-of-the-art technology, it increases the efficiency in the manufacturing of large sized panel. The ODF Process can save a great deal of time and liquid crystal material that has a competitive edge particularly for large size panel. For example, it requires about 5 days to fill the liquid crystal for a 30 inches panel according to the traditional vacuum suction method, but it only needs 5 minutes by adoption of the ODF method. Thereby the consumption of liquid crystal material can be reduced to approximately 40% as compared to the traditional method.

Figure 8:
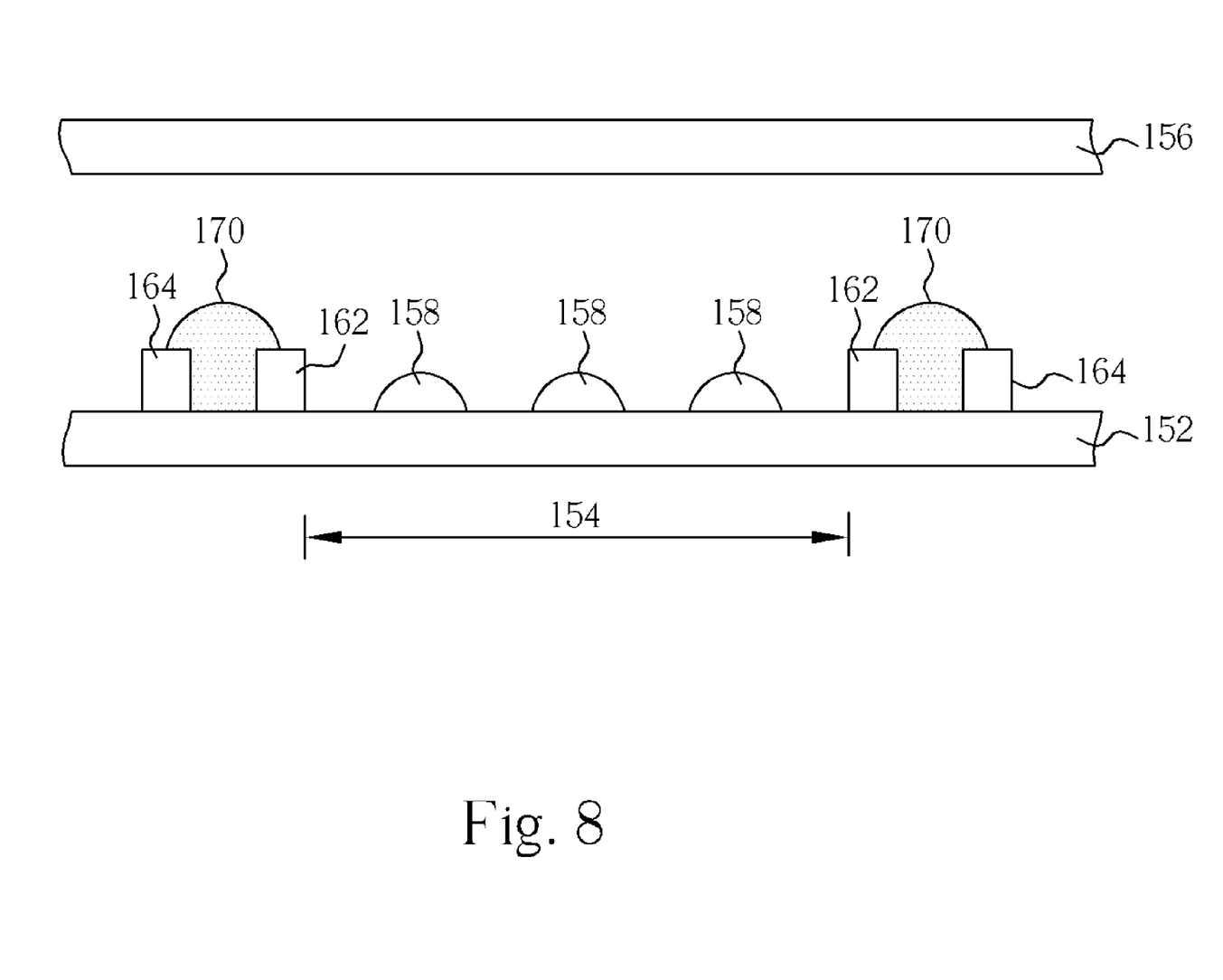

As shown in FIG. 8, seal 170 is provided in the groove 166 between the inner spacer wall 162 and the outer spacer wall 164 under vacuum environment or reduced pressure. It is noteworthy that the volume of the seal 170 spread in the groove 166 is slightly greater than the space of the groove 166. According to the preferred embodiment of this invention, the seal 170 may be photo hardening seal, ultraviolet-type seal or thermal hardening seal.

Figure 9:
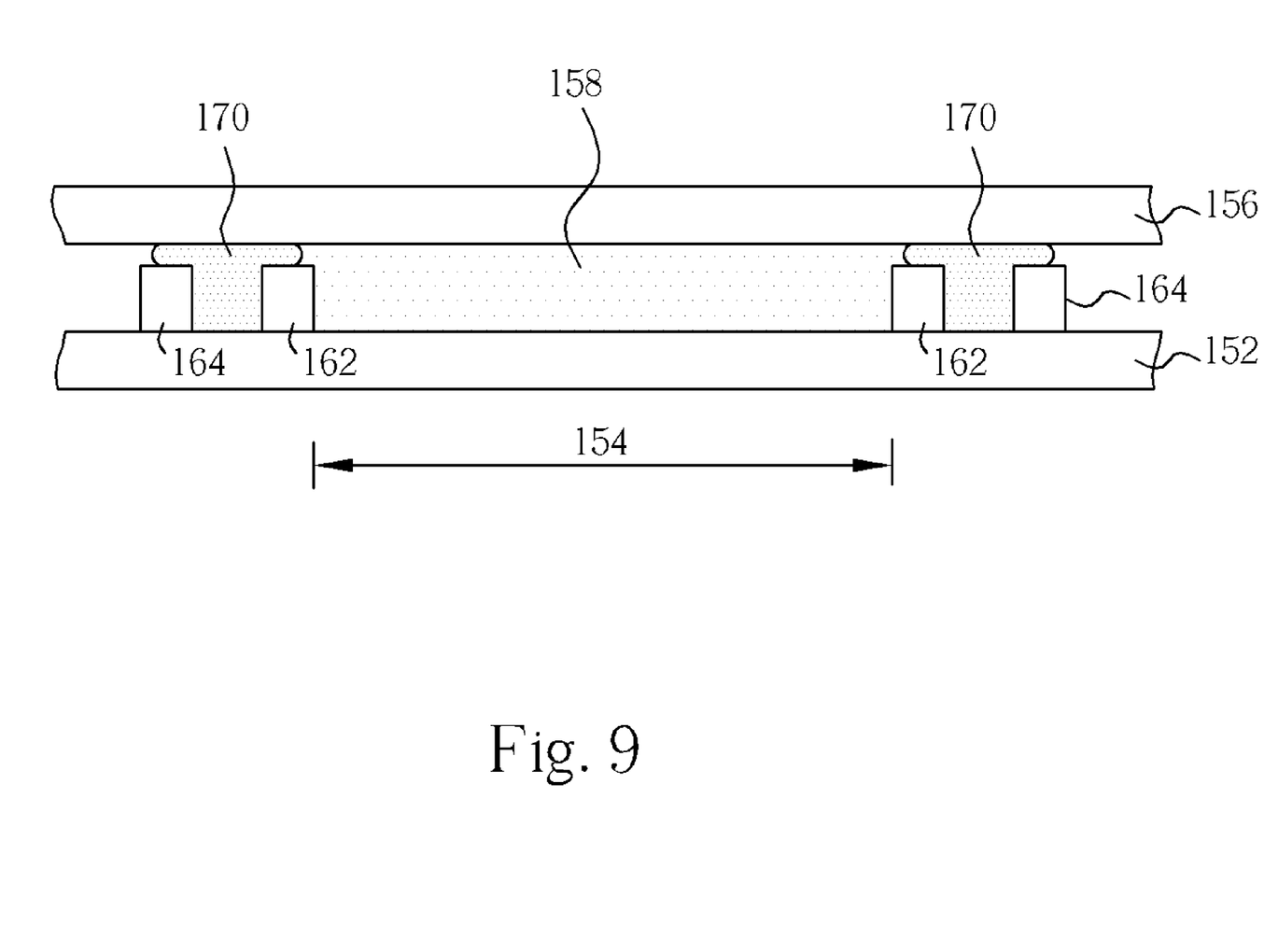

Finally, as shown in FIG. 9, a glass substrate 156 is glued together with the silicon substrate 152 via seal 170 to form panel assembly. The glass substrate 156 is in parallel with the silicon substrate 152. The panel assembly is then subjected to ultraviolet to cure the seal 170. In another case, the panel assembly is treated with thermal process to harden the seal 170. The panel assembly is then cut into panel die by using conventional methods.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of fabricating a liquid crystal panel, comprising:

providing a first substrate comprising thereon a display active region;

depositing a dielectric layer over the first substrate by using chemical vapor deposition methods;

etching a portion of the dielectric layer to expose the display active area and to form an inner spacer wall and an outer spacer wall enclosing the display active region, and a groove between the inner spacer wall and the outer spacer wall, wherein the inner spacer wall and the outer spacer wall are of approximately equal height;

spreading seal in the groove;

performing an liquid-crystal fill process to dispose drops of liquid crystal on the display active region within the inner spacer wall;

placing a second substrate on the first substrate, wherein the second substrate is supported by the inner and outer spacer walls and is glued to the first substrate via the seal; and curing the seal.

2. The method according to claim 1 wherein the first substrate is a silicon substrate and the second substrate is a glass substrate.

3. The method according to claim 1 wherein there is no spherical spacer dispersed between the first and second substrates.

4. The method according to claim 1 wherein the dielectric materials include silicon dioxide.

5. The method according to claim 1 wherein the seal comprises thermal hardening seal.

6. The method according to claim 1 wherein the seal comprises UV hardening seal.

7. The method according to claim 1 wherein the height of the inner and outer spacer walls is approximately equal to a cell gap between the first and second substrates.

8. The method according to claim 1 wherein the liquid-crystal fill process comprises one-drop-fill process and vacuum suction liquid-crystal fill process.

* * * * *